United States Patent
Abbey et al.

(10) Patent No.: US 7,475,218 B2
(45) Date of Patent: Jan. 6, 2009

(54) APPARATUS AND METHOD FOR AUTONOMICALLY DETECTING RESOURCES IN A LOGICALLY PARTITIONED COMPUTER SYSTEM

(75) Inventors: Christopher Patrick Abbey, Rochester, MN (US); Troy David Armstrong, Rochester, MN (US); William Joseph Armstrong, Rochester, MN (US); Gregory Michael Nordstrom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 10/624,352

(22) Filed: Jul. 22, 2003

(65) Prior Publication Data

US 2005/0022200 A1    Jan. 27, 2005

(51) Int. Cl.
*G06F 12/14* (2006.01)
*G06F 15/16* (2006.01)

(52) U.S. Cl. .................................... 711/173; 709/203
(58) Field of Classification Search .................. None
See application file for complete search history.

(56) References Cited

U.S. PATENT DOCUMENTS

2002/0052914 A1* 5/2002 Zalewski et al. ............ 709/203

* cited by examiner

*Primary Examiner*—Hyung S Sough
*Assistant Examiner*—Duc T Doan
(74) *Attorney, Agent, or Firm*—Martin & Associates, LLC; Derek P. Martin

(57) ABSTRACT

A partition manager includes a resource detection mechanism that uses a persistent resource database to determine which resources were seen previously, and to determine which resources are required for a logical partition to start. Once all required resources for a logical partition are detected, the logical partition is started. In this manner, a logical partition may be started as soon as all of its resources are available, without waiting on the resources of other logical partitions. In addition, a missing required resource will prevent a logical partition from starting, thus avoiding the crash of a logical partition due to missing resources.

21 Claims, 6 Drawing Sheets

APPARATUS AND METHOD FOR
AUTONOMICALLY DETECTING
RESOURCES IN A LOGICALLY
PARTITIONED COMPUTER SYSTEM

BACKGROUND OF THE INVENTION

1. Technical Field

This invention generally relates to data processing, and more specifically relates to detection of resources in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined that allocate 50% of the CPU to each partition, that allocate 33% of the memory to the first partition and 67% of the memory to the second partition, and that allocate two different I/O slots to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

One problem with known logically partitioned computer systems occurs when the computer system initially powers up. The computer system may include multiple physical enclosures coupled together with cables or other interconnection mechanisms. A prior art method 200 is shown in FIG. 2. Method 200 begins upon initial system power on (step 210). The partition manager is initialized (step 220). The partition manager then waits for a preset delay period to expire (step 230). This delay period is necessary to give all of the resources in all of the physical enclosures sufficient time to power up and/or be initialized. Once the delay period expires in step 230, the logical partitions are started (step 240).

Prior art method 200 suffers from several drawbacks. First, the delay period in step 230 is typically selected to be long enough to allow all of the resources to be powered up and properly initialized. As a result, all logical partitions must wait until all resources for all logical partitions are ready before any logical partition may be started. The result is potentially long delays (on the order of minutes) in starting logical partitions after the computer system is powered on, because all logical partitions are delayed from starting for the worst case delay of all resources. A second drawback occurs when resources power on at non-deterministic delays, which could result from temporary disconnection or "offline for service" conditions. In this case, there may be one or more resources that are still unavailable even after the preset delay period expires. As a result, the logical partitions may be started in step 240 even though some have missing resources, possibly leading to those partitions being unable to boot (if the boot device is not powered or initialized at that time) or crashing when they discover the missing resources. Without a way to autonomically detect resources in a logically partitioned computer system, the computer industry will continue to suffer from the drawbacks in the prior art, discussed above.

DISCLOSURE OF INVENTION

A partition manager includes a resource detection mechanism that uses a persistent resource database to determine which resources were seen previously, and to determine which resources are required for a logical partition to start. Once all required resources for a logical partition are detected, the logical partition is started. In this manner, a logical partition may be started as soon as all of its resources are available, without waiting on the resources of other logical partitions. In addition, a missing required resource will prevent a logical partition from starting, thus avoiding the crash of a logical partition due to missing resources.

The preferred embodiments are well-suited to detecting I/O slots in a logically partitioned computer system. Note, however, that the preferred embodiments expressly extend to the detection of any hardware or software resource, including I/O buses, I/O communication channels, virtual I/O slots or devices, CPUs, and memory.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a resource detection mechanism creates a persistent resource database on first boot and uses this database in subsequent boots to determine which resources were seen previously, and which are required for a selected logical partition to be started. Once all resources for a logical partition have been detected, the logical partition may be started without waiting for the resources of other logical partitions. The result is that logical partitions are initialized as soon as their required resources are detected (i.e., become available). The result is a boot sequence that starts logical partitions as soon as possible, and that avoid starting a logical partition if one or more of its required resources are not detected (i.e., are unavailable). The preferred embodiments also support powering off resources owned by a logical partition when the logical partition is powered off.

Note that the term "resource" as used in the specification and claims herein denotes any whole or fractional portion of hardware or software in the computer system that may be independently allocated to a logical partition. Examples of resources include: a physical I/O slot; a group of I/O slots in a physical enclosure; a portion of a processor; a portion of memory; a virtual I/O slot; etc.

Figure 1:
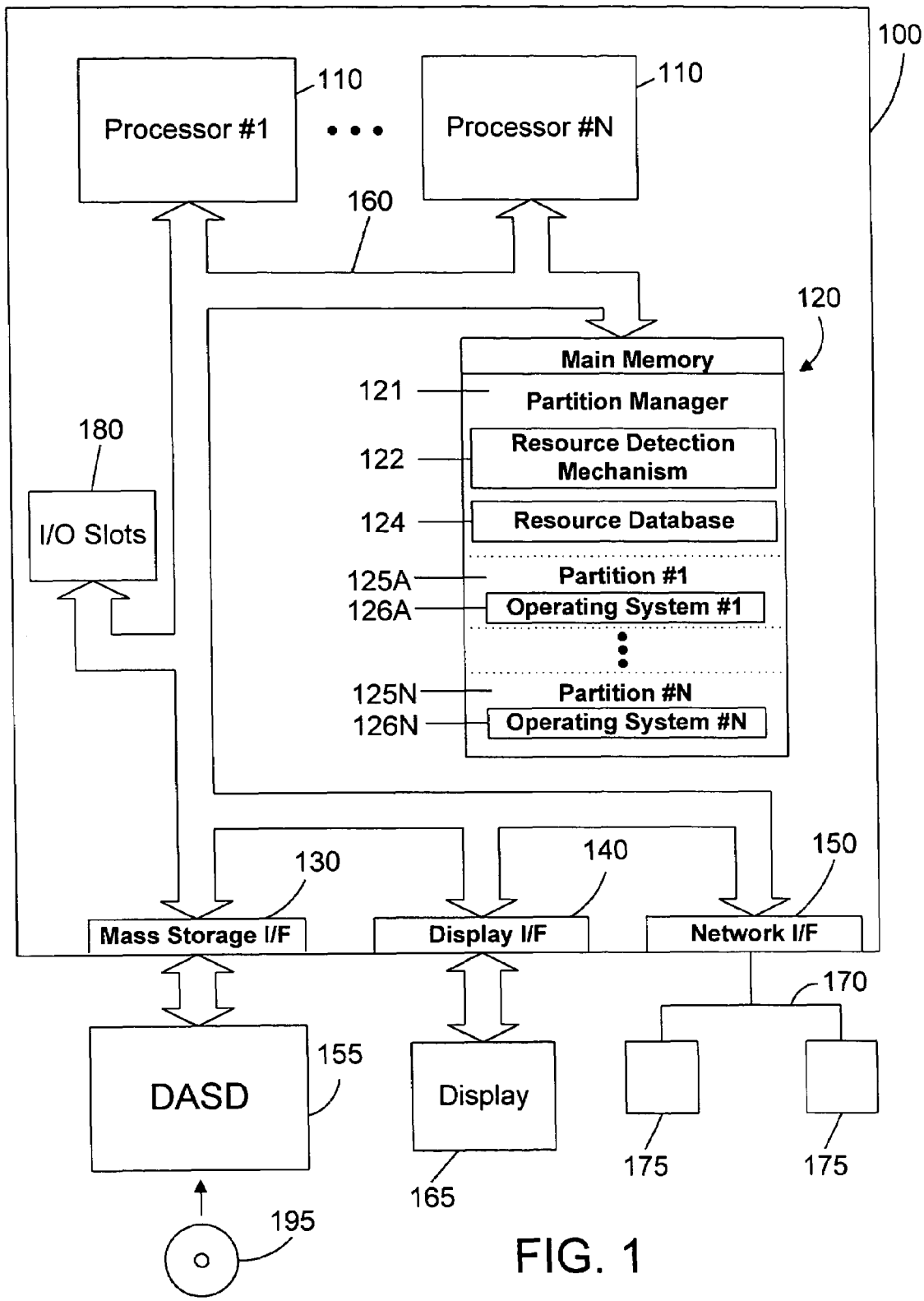
FIG. 1 is a block diagram of a computer apparatus that supports logical partitioning and resource detection in accordance with the preferred embodiments.
Figure 2:
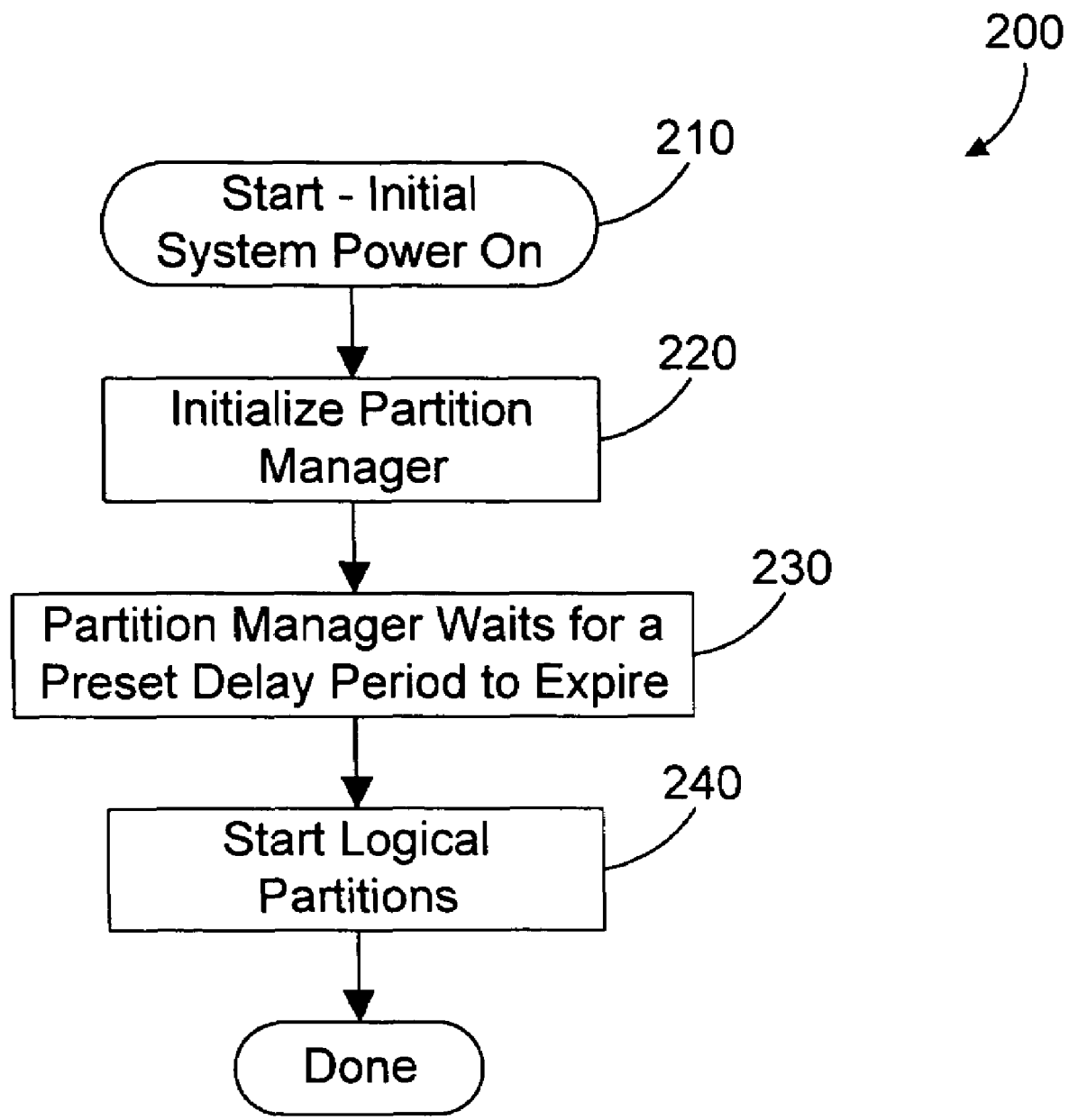
FIG. 2 is a flow diagram of a prior art method performed during initial system power on of a logically partitioned computer system.

Referring to FIG. 1, a computer system 100 is an IBM eServer iSeries or pSeries computer system, and represents one suitable type of computer system that supports logical partitioning and resource detection in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of 110 slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180.

Main memory 120 contains a partition manager 121, a resource detection mechanism 122, a resource database 124, and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

Resource detection mechanism 122 detects when a resource becomes available. Resource database 124 is a persistent database that includes one or more tables that list resources detected during previous power on cycles of the computer system 100, and that indicates which resources are owned by each of the logical partitions. Resource detection mechanism 122 consults the resource database 124 to determine which resources are owned by a logical partition. Once the resource detection mechanism 122 detects all required resources owned by a logical partition, that logical partition may be started, without waiting for the resources for other logical partitions to be detected. Furthermore, the resource detection mechanism 122 waits until all resources for a logical partition are detected before starting the logical partition. Thus, if a resource is unavailable due to a hardware failure, service operation, cable disconnect, etc., the start of the logical partition will be delayed until the resource detection mechanism 122 has detected that all required resources are available. In this manner, resource detection mechanism 122 autonomically detects when all required resources are available and starts the corresponding logical partition as soon as possible, assuming the logical partition is scheduled to start at system power on.

It is also possible for a system administrator to schedule the start of logical partitions at a specified time. In this case, the detection of resources may occur before the scheduled time, but the start of the logical partition will be delayed until the scheduled time arrives. If one or more requires resources are still not available when the scheduled time arrives, the start of the logical partition will be further delayed until all required resources are detected. This autonomic detection of resources by resource detection mechanism 122 allows the partition manager 121 to automatically start a logical partition when resources become available. Thus, if a computer system is powered up without one if its I/O enclosures being powered for service of the I/O enclosure, the partition manager 121 will detect when the I/O enclosure is powered up and will automatically start all logical partitions that had all of their required resources detected except for those in the I/O enclosure.

The term "required resource" is broadly defined to mean any resource that is deemed necessary for a logical partition to start. The simplest implementation would assume that all resources in the resource database 124 that are owned by a selected logical partition are required for the selected logical partition to be started. However, it is also within the scope of the preferred embodiments to designate some resources as "required" while others may be designated "non-required" in the resource database. The determination of which resources are required and which are non-required could be made using any suitable heuristic by either a human operator or by a computer-implemented algorithm. By defining required and non-required resources, a logical partition may start once all of its required resources have been detected, even though one or more non-required resource has not yet been detected.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180. Thus, one partition could be defined to include two processors and a portion of memory 120, along with one or more I/O processors that can provide the functions of mass storage interface 130, display interface 140, network interface 150, or interfaces to I/O devices plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121, the resource detection mechanism 122, and the resource database 124 preferably reside in memory and hardware separate from the logical partitions and are facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which performs the detection of resources and starts the logical partitions (once their resources are detected) by initializing the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figures 4, 5:
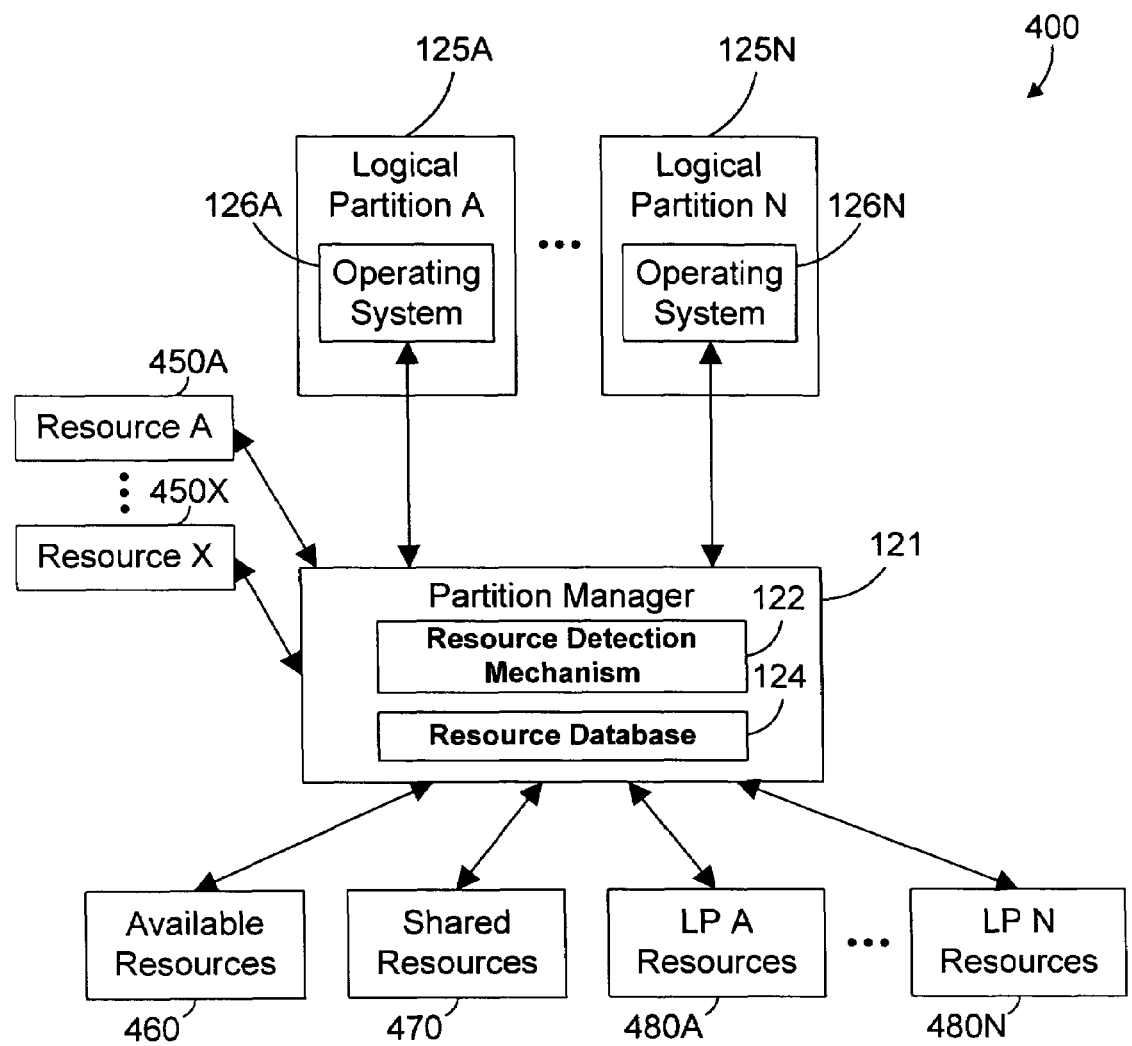
FIG. 4 is a block diagram showing a logical view of the computer system 100 of FIG. 1.
FIG. 5 is a table showing one specific implementation of a resource database table in accordance with the preferred embodiments.

While FIG. 1 shows a sample computer system that includes some of the salient features of both hardware and software in accordance with the preferred embodiments, a more detailed logical view of some of the components in FIG. 1 is shown as system 400 in FIG. 4. In system 400, N logical partitions 125A-125N are shown executing their respective operating systems 126A-126N. The logical partitions are managed by a partition manager 121. Partition manager 121 manages resources 450, shown in FIG. 4 as resource 450A through resource 450X. A "resource" in this context may be any hardware or software that may be independently allocated by partition manager 121 to one or more of the logical partitions. Examples of hardware resources include processors, memory, hard disk drives, and I/O slots. Examples of software resources include a database, internal communications (such as a logical LAN), virtual I/O slots or devices, Infiniband queue pairs, interactive capacity, or applications (such as word processors, e-mail, etc.).

A resource, once made available to the partition manager 121, is categorized as an available resource 460 if it has not yet been assigned to a logical partition, is categorized as a shared resource 470 if multiple logical partitions may access the resource, and is categorized as a dedicated resource 480 if it has been exclusively assigned to a logical partition. FIG. 4 shows dedicated resources 480A . . . 480N that correspond to each logical partition 125A . . . 125N. Dedicated resources 480 are said to be "owned" by the logical partition to which they are assigned. The partition manager 121 includes a resource detection mechanism 122 that detects a resource when the resource becomes available, and reads the resource database 124 to determine which logical partition owns the detected resource. The resource database 124 also indicates which resources are required to start a logical partition based on past history of required resources during previous power on cycles of the computer system. Once all required resources for a selected logical partition have been detected, the partition manager 121 starts the selected logical partition.

Figure 3:
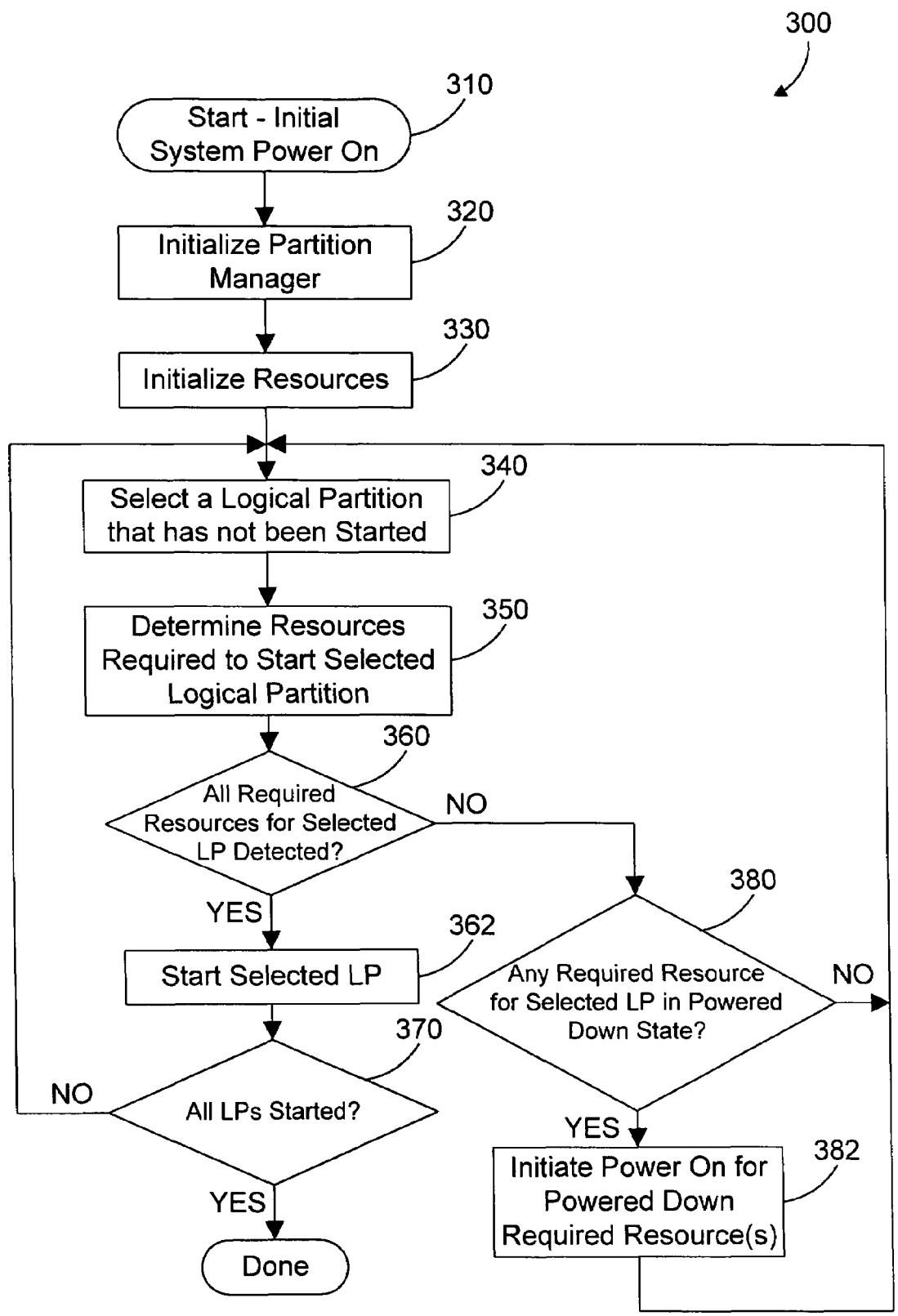
FIG. 3 is a flow diagram of a method of steps performed during initial system power on of a logically partitioned computer system in accordance with the preferred embodiments.

Referring now to FIG. 3, a method 300 in accordance with the preferred embodiments begins upon initial system power on (step 310). The partition manager is initialized (step 320), and the initialization of resources is commenced (step 330). At this point of time, or at a system administrator-scheduled clock time, a logical partition that has not been started is selected (step 340). The resources required to start the logical partition are determined (step 350), preferably by reading from the resource database 124. If all required resources for the selected logical partition have been detected (step 360=YES), the selected logical partition is started (step 362). If there are other logical partitions that need to be started (step 370=NO), method 300 loops back to step 340 and execution continues. If all logical partitions have been started (step 370=YES), method 300 is done.

If there are required resources for the selected logical partition that have not been detected (step 360=NO), method 300 determines whether any required resource is in a powered down state (step 380). If not (step 380=NO), method 300 loops back to step 340 and execution continues. If so (step 380=YES), power on for the powered down required resource(s) is initiated (step 382), and execution continues at step 340.

While the flow diagram of method 300 in FIG. 3 is shown to sequentially consider different logical partitions one at a time, one skilled in the art will recognize that the preferred implementation of method 300 determines which resources are required for all logical partitions, and as each resource is detected, determines which logical partition owns the detected resource, and when the detected resource is the last resource required to start a logical partition, the logical partition is started. In this manner, no logical partition waits for any resources other than its own to be detected. The result is a system that is somewhat asynchronous, with each logical partition being started when its last resource is detected without regard to the state of other logical partitions. This means that each logical partition that is scheduled to start at system power on is started at its earliest possible time, and any logical partition that does not have all of its resources detected will not start. Of course, logical partitions that are scheduled to start at a later time will be started at that time, assuming all their required resources have been detected when the scheduled time arrives. The preferred embodiments eliminate the problems in the prior art of making all logical partitions wait on the slowest resource to be initialized, and potentially starting a logical partition when one or more of its resources are unavailable due to a failure, reconfiguration, etc.

One specific implementation of resource database 124 is shown by the database table 500 in FIG. 5. Database table 500 preferably includes a field that contains a unique token, a field that indicates which logical partition owns the resource, a field that indicates whether the resource has been detected during the current initial program load (IPL), and a field that contains vital product data (VPD) that describes the resource. Note that database table 500 is persistent, which means it survives across different power on cycles for the computer system.

Figure 6:
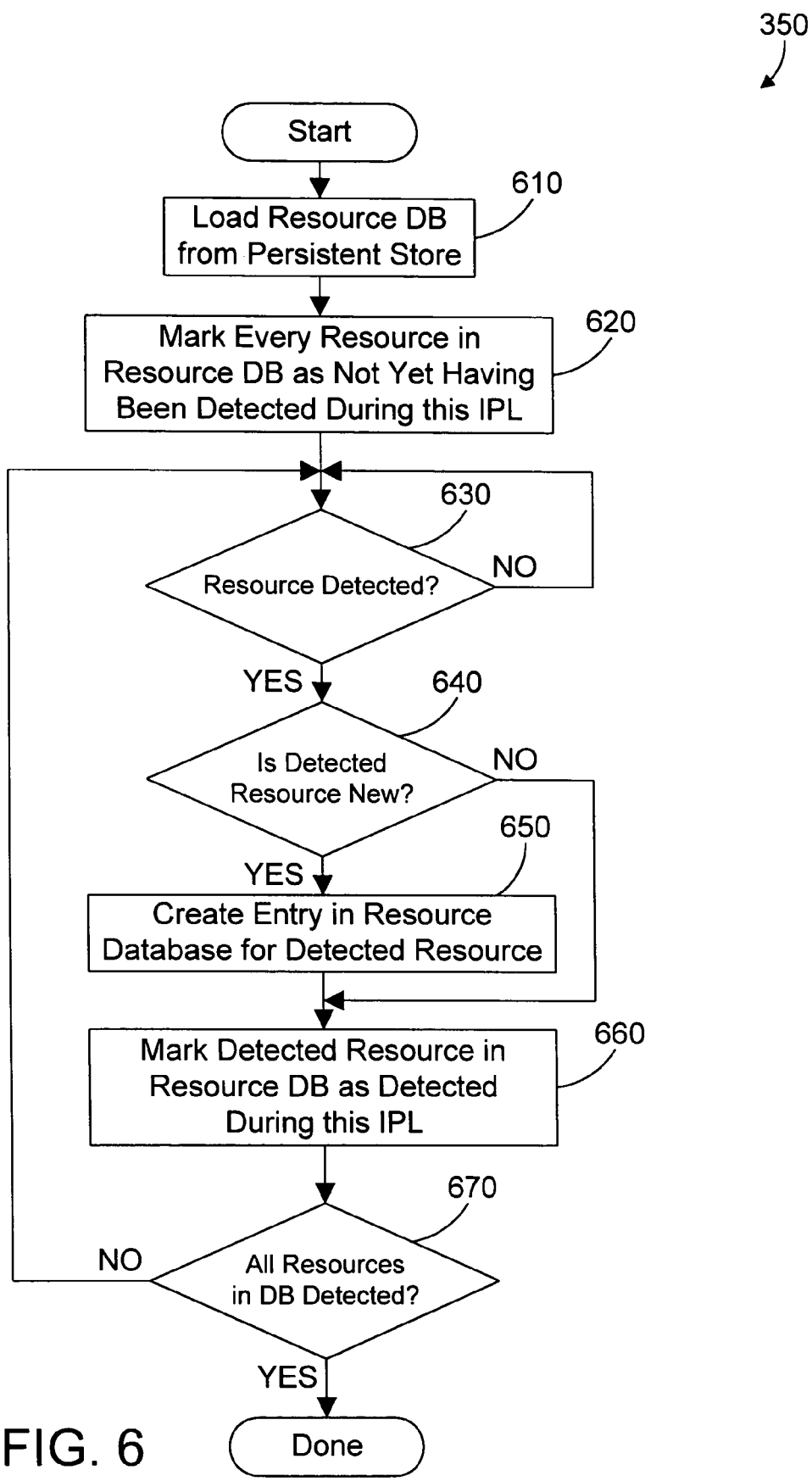
FIG. 6 is a flow diagram of a specific implementation of step 350 in FIG. 3 in accordance with the preferred embodiments.

FIG. 6 shows one specific implementation of step 350 in FIG. 3 in accordance with the preferred embodiments. When the computer system is powered on, the resource database is read from the persistent store (step 610). When the computer system is powered on for the first time, the database will be empty. We assume for the sake of illustration that this power on cycle is not the first power on cycle, and that table 500 in FIG. 5 is read from the resource database. The "Resource Detected This IPL" field for all resources in table 500 is marked NO to indicate the beginning of the power on cycle (i.e., that no resources have been detected yet) (step 620). When a resource is detected (step 630=YES), it is determined whether the detected resource is new, i.e., not in the resource database. If the detected resource is new (step 640=YES), an entry is created in the resource database that corresponds to the detected resource (step 650). The "Resource Detected This IPL" field for that resource is changed to YES in the database table 500 to mark that the resource has been detected (step 660). If there are still more resources that have not been detected (step 670=NO), control passes to step 630. Once all resources in the database table 500 have been detected (step 670=YES), step 350 is done.

Figure 7:
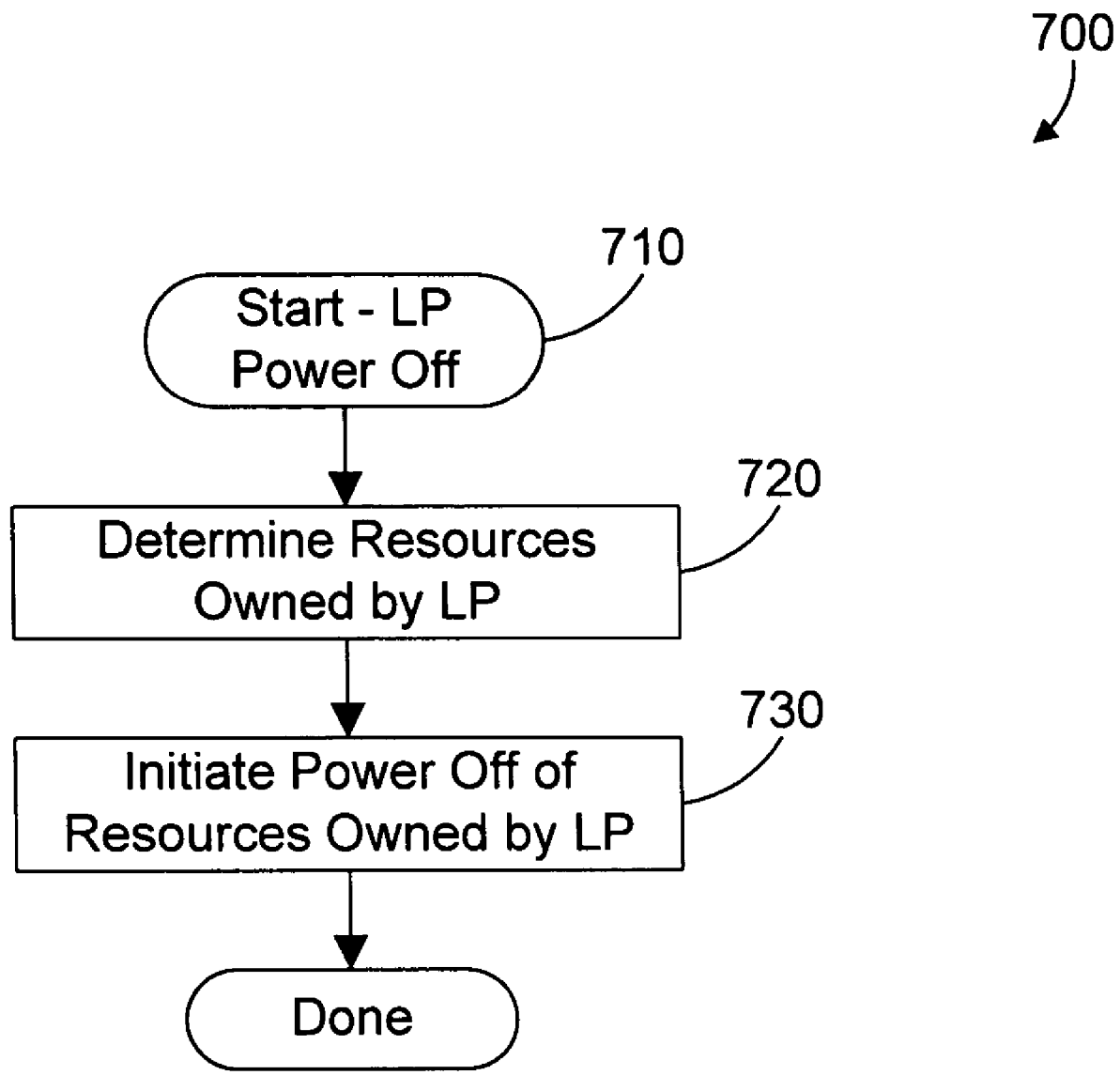
FIG. 7 is a flow diagram of a method in accordance with the preferred embodiments for powering off resources owned by a logical partition when the logical partition is powered off.

Another aspect of partition manager 121 in the preferred embodiments is the ability to turn off resources owned by a logical partition when the logical partition is powered off. Referring to FIG. 7, a method 700 begins when a logical partition needs to be powered off, or has already been powered off (step 710). Note that the term "powered off" simply means that a logical partition is stopped, preferably by halting execution of its operating system. The resources owned by the logical partition are determined (step 720), preferably by reading the resource database 124. Method 700 then initiates power down of the resources owned by the logical partition (step 730). Note that the power state of a resource for one logical partition might be linked to one or more resources in a different logical partition. For example, if a physical enclosure includes four I/O slots, and power to all four I/O slots is either on or off, method 700 will be unable to power down one of the I/O slots assigned to a logical partition that is powering off. Method 700 expressly includes the intelligence to know whether power off of a resource affects resources in other logical partitions, and to not turn off power to a resource if so doing will affect resources owned by other logical partitions.

The preferred embodiments provide a significant advance over the prior art by providing a persistent resource database that records which resources were seen in previous executions of a logically partitioned computer system. The resource database includes information that indicates which logical partition owns each resource. As a result, the resource database indicates all resources that are required for a logical partition to run. As soon as the last of the required resources is detected, the logical partition may be started without regard to the state of the other logical partitions. In this manner all logical partitions are started as soon as all of their required resources are available, without waiting for any resource owned by any other logical partition. In addition, no logical partition will start until all of its resources are available, which avoids the crash of a logical partition due to missing resources.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while I/O slots are one specific type of resource that may be detected, any type of resource, both hardware and software, could also be detected within the scope of the preferred embodiments.

What is claimed is:

1. An apparatus comprising:
   at least one processor;
   a memory coupled to the at least one processor;
   a plurality of logical partitions defined on the apparatus;
   a persistent resource database residing in the memory, the resource database including a list of resources owned by each of the plurality of logical partitions, where the resources were detected in previous power on cycles of the apparatus; and a resource detection mechanism residing in the memory and executed by the at least one processor, the resource detection mechanism determining from the resource database a set of required resources owned by a selected logical partition, detecting each resource as the resource is initialized, detecting when at least one required resource for the selected logical partition is not powered up, initiating power up of the at least one required resource that is not powered up, and starting the selected logical partition when all required resources owned by the selected logical partition have been detected.

2. The apparatus of claim 1 wherein the resources include at least one hardware resource.

3. The apparatus of claim 1 wherein the resources include at least one software resource.

4. The apparatus of claim 1 wherein the resource detection mechanism initiates power off of a plurality of resources owned by the selected logical partition in response to the selected logical partition being powered off.

5. An apparatus comprising:
    at least one processor;
    a memory coupled to the at least one processor;
    a plurality of logical partitions defined on the apparatus;
    a persistent resource database residing in the memory, the resource database including a list of resources owned by each of the plurality of logical partitions, where the resources were detected in previous power on cycles of the apparatus; and
    a resource detection mechanism residing in the memory and executed by the at least one processor, the resource detection mechanism determining from the resource database a set of required resources owned by a selected logical partition, detecting each resource as the resource is initialized, and starting the selected logical partition when all required resources owned by the selected logical partition have been detected, the resource detection mechanism further detecting when at least one required resource for a selected logical partition is not powered up and initiating power up of the at least one required resource that is not powered up, the resource detection mechanism initiating power off of a plurality of resources owned by the selected logical partition in response to the selected logical partition being powered off.

6. The apparatus of claim 5 wherein the resources include at least one hardware resource.

7. The apparatus of claim 5 wherein the resources include at least one software resource.

8. A computer-implemented method for initializing a computer system that includes a plurality of logical partitions, the method comprising the steps of:
    storing in a persistent resource database a list of resources owned by each of the plurality of logical partitions during previous power on cycles of the computer system;
    determining from the resource database a set of required resources owned by a selected logical partition;
    detecting each resource as the resource is initialized;
    detecting when at least one required resource for a selected logical partition is not powered up;
    initiating power up of the at least one required resource that is not powered up; and
    starting the selected logical partition when all required resources owned by the selected logical partition have been detected.

9. The method of claim 8 wherein the resources include a hardware resource.

10. The method of claim 8 wherein the resources include a software resource.

11. The method of claim 8 further comprising the step of initiating power off of a plurality of resources owned by the selected logical partition in response to the selected logical partition being powered off.

12. A computer-implemented method for initializing a computer system that includes a plurality of logical partitions, the method comprising the steps of:
    storing in a persistent resource database a list of resources owned by each of the plurality of logical partitions during previous power on cycles of the computer system;
    determining from the resource database a set of required resources owned by a selected logical partition;
    detecting each resource as the resource is initialized;
    starting the selected logical partition when all required resources owned by the selected logical partition have been detected;
    detecting when at least one required resource for a selected logical partition is not powered up;
    initiating power up of the at least one required resource that is not powered up; and
    initiating power off of a plurality of resources owned by the selected logical partition in response to the selected logical partition being powered off.

13. The method of claim 12 wherein the resources include a hardware resource.

14. The method of claim 12 wherein the resources include a software resource.

15. A program product comprising:
    (A) a resource detection mechanism that determines from a persistent resource database in a computer system that includes a plurality of logical partition a set of required resources owned by a selected logical partition, the resource detection mechanism detecting each resource as the resource is initialized and starting the selected logical partition when all required resources owned by the selected logical partition have been detected, wherein the resource detection mechanism detects when at least one required resource for the selected logical partition is not powered up, and initiates power up of the at least one required resource that is not powered up; and
    (B) recordable computer readable signal bearing media bearing the resource detection mechanism.

16. The program product of claim 15 wherein the resources include at least one hardware resource.

17. The program product of claim 15 wherein the resources include at least one software resource.

18. The program product of claim 15 wherein the resource detection mechanism initiates power off of a plurality of resources owned by the selected logical partition in response to the selected logical partition being powered off.

19. A program product comprising:
    (A) a resource detection mechanism that determines from a resource database in a computer system that includes a plurality of logical partitions a set of required resources owned by a selected logical partition, the resource detection mechanism detecting each resource as the resource is initialized and starting the selected logical partition when all required resources owned by the selected logical partition have been detected, the resource detection mechanism further detecting when at least one required resource for a selected logical partition is not powered up and initiating power up of the at least one required resource that is not powered up, the resource detection mechanism initiating power off of a plurality of resources owned by the selected logical partition in response to the selected logical partition being powered off; and (B) recordable computer readable signal bearing media bearing the resource detection mechanism.

20. The program product of claim 19 wherein the resources include at least one hardware resource.

21. The program product of claim 19 wherein the resources include at least one software resource.

* * * * *